(12) United States Patent
Massie

(10) Patent No.: US 6,721,810 B2
(45) Date of Patent: Apr. 13, 2004

(54) UNIVERSAL CONTROLLER EXPANSION MODULE SYSTEM, METHOD AND APPARATUS

(75) Inventor: Michael Ross Massie, Bristol, TN (US)

(73) Assignee: Siemens Energy & Automation, Alpharetta, GA (US)

(*) Notice: Subject to any disclaimer, the term of this patent is extended or adjusted under 35 U.S.C. 154(b) by 229 days.

(21) Appl. No.: 09/942,248

(22) Filed: Aug. 29, 2001

(65) Prior Publication Data

US 2002/0069303 A1 Jun. 6, 2002

Related U.S. Application Data

(60) Provisional application No. 60/229,436, filed on Aug. 31, 2000.

(51) Int. Cl.[7] .............................................. G06F 13/12
(52) U.S. Cl. ................................. 710/3; 710/305; 70/34
(58) Field of Search ........................ 710/3, 305; 701/34

(56) References Cited

U.S. PATENT DOCUMENTS

| 4,616,306 | A | | 10/1986 | Kuzma et al. ............... 364/140 |
|---|---|---|---|---|
| 5,754,451 | A | | 5/1998 | Williams ................ 364/551.01 |
| 5,790,432 | A | * | 8/1998 | Morys .................... 364/571.04 |
| 5,802,389 | A | | 9/1998 | McNutt ....................... 395/821 |
| 5,909,586 | A | | 6/1999 | Anderson ..................... 395/282 |
| 6,115,654 | A | * | 9/2000 | Eid et al. ....................... 701/34 |
| 6,301,633 | B1 | * | 10/2001 | Chapman ..................... 710/129 |
| 6,601,124 | B1 | * | 7/2003 | Blair ........................... 710/305 |

FOREIGN PATENT DOCUMENTS

| DE | 196 49 980 A1 | 6/1998 |
|---|---|---|
| EP | 0772 107 A2 | 5/1997 |
| EP | 0965 895 A2 | 12/1999 |

* cited by examiner

*Primary Examiner*—Abdelmoniem Elamin

(57) ABSTRACT

A universal expansion module interfaces a logic controller to a plurality of types of input/output expansion modules that communicate input/output data between the controller and automated devices. A communication interface establishes communication between the controller and at least one of the plurality of types of an input/output expansion module. An expansion module having a physical configuration accommodates signals from the plurality of types of input/output expansion modules.

20 Claims, 15 Drawing Sheets

| Signal Name | Description |
| --- | --- |
| EMD | Expansion Module Data: Bi-directional signal used to communicate address and data to and from the module. |
| EMC0 | Expansion Module Clock 0: Used to access expansion module I/O. Active only during bus transaction. Frequency = 4.125 MHz |
| XA_OD | Address / Output Disable: Active Low, controlled by the Master Function.<br>Dual function signal: XOD - A long pulse, 10 times the clock period or greater will reset the expansion modules. XAS - A short pulse, approximately one clock period, initiates an expansion module bus transaction. |
| EMA[2:0] | Expansion Module Address: Daisy chained from PLC to module to module. Value input to a module becomes that modules address. The module will output its address + 1 to the next module. The module closest to the PLC will have an address of 0. A total of 7 EM can be connected (0:6) |
| +5V | 5 volt power supply – two signal lines |
| GND | Power supply return – two signal lines |

| Signal Name | Description | # of Signal |
|---|---|---|
| MA_IN [2:0] | Input, Module Address | 3 |
| MA_OUT [2:0] | Output, Module Address + 1 | 3 |
| XAS | Input: Active Low, initiates bus transaction | 1 |
| XOD | Input: Active Low, EM Reset | 1 |
| EMC0 | Input: Gated Clock, 4.125 MHz Maximum Read => 24 clocks, Write => 25 clocks | 1 |
| EMD | Bi-directional Data Line | 1 |
| ID_BUF [6:0] | Input (Register ID), Identifies EM Type, Decodes ASIC Mode of operation ( Mode 0 or 1) | 7 |
| EXT0 [7:0] | External Port 0<br>Dual Function: Mode 0. Input Data Bus<br>Mode 1. Bi-directional Data Bus | 8 |
| EXT1 [7:0] | External Port 1<br>Dual Function: Mode 0. Output Data Bus<br>Mode 1. Output Address & Control | 8 |
| MSTR_IN | Bus Driver Enable, Active Low | 1 |
| MY_SLAVE_OUT | Bus Driver Enable, Active Low | 1 |
| NEXT_SLAVE_OUT | Bus Driver Enable, Active Low | 1 |
| | | 36 Total I/O Pins |

Fig. 7a

| EXT 1 | Mode 1 Function | Description |
|---|---|---|
| bit 7 | CS | Chip Select, Active Low, OR'd condition of WRSTRB & RDSTRB |
| bit 6 | Busy | Active Low, indicates activity on the EXT0 & EXT1 |
| bit 5 | WRSTRB | Write Strobe: Active Low, external decode circuitry |
| bit 4 | RDSTRB | Read Strobe: Active Low, external decode circuitry |
| bit 3 | RA3 | Register Address Bit 3, Active High |
| bit 2 | RA2 | Register Address Bit 2, Active High |
| bit 1 | RA1 | Register Address Bit 1, Active High |
| bit 0 | RA0 | Register Address Bit 0, Active High |

UNIVERSAL CONTROLLER EXPANSION MODULE SYSTEM, METHOD AND APPARATUS

This application claims the benefit of Provisional Application No. 60/229,436, filed Aug. 31, 2000.

BACKGROUND

1. Field of the Invention

The present invention relates to an expansion module and, more particularly, a universal expansion module system, method and apparatus for universally coupling a logic controller to a plurality of types of input/output expansion modules.

2. Related Information

In the field of Logic Controllers, which include Programmable Logic Controllers (PLC) and Continuous Loop Controllers (CLC), for example, the Logic Controller is typically arranged in a rack configuration having a master controller coupled to one or more inputoutput (I/O) modules through a backplane that provides a common bus and a power source. The master controller is coupled through the I/O modules to various automation devices including, for example, motors, switches, turbines, boilers, etc. The entire composition of devices coupleable to the PLC is probably unlimited and those skilled in the art know well the various devices available for connection. In addition, the master controller is coupleable to other PLCs to form a master/slave arrangement whereby the master controller controls the slave controllers. Typically, the master controls the timing at which particular devices are to engage in operations and the slaves are responsible for carrying out the processing for driving the devices.

OBJECTS & SUMMARY OF THE INVENTION

An object of the present invention is to provide a universal expansion module.

In accordance with the foregoing objectives, the present invention provides a universal expansion module apparatus for interfacing a logic controller to a plurality of types of input/output expansion modules that communicate input/output data between the controller and automated devices. A communication interface establishes communication between the controller and at least one of the plurality of types of an input/output expansion module. An expansion module having a physical configuration that accommodates signals from the plurality of types of input/output expansion modules.

The invention also provides a universal expansion module system. A logic controller has a configuration for driving an automated device. An input/output expansion module of a plurality of types couple the logic controller to the automated device. An expansion module has a physical configuration that accommodates signals from the plurality of types of input/output expansion.

The invention further provides a method for accommodating a logic controller to interface to a plurality of types of input/output expansion modules. In the novel method, there is the step of providing a common physical configuration for accommodating the plurality of types of input/output expansion modules. Next, there is provided establishing a first mode of operation to accommodate signals associated with a first type of input/output expansion module. Then, the step of establishing a second mode of operation is provided to accommodate signals associated with a second type of input/output expansion module.

BRIEF DESCRIPTION OF THE DRAWINGS

FIG. 1 is a table of the I/O expansion bus signals;

FIG. 4 is a table of I/O ASIC input/output signals;

FIG. 7a is a table of the bits set for a Mode 1 transaction;

DETAILED DESCRIPTION OF THE PREFERRED EMBODIMENTS

Figure 14:
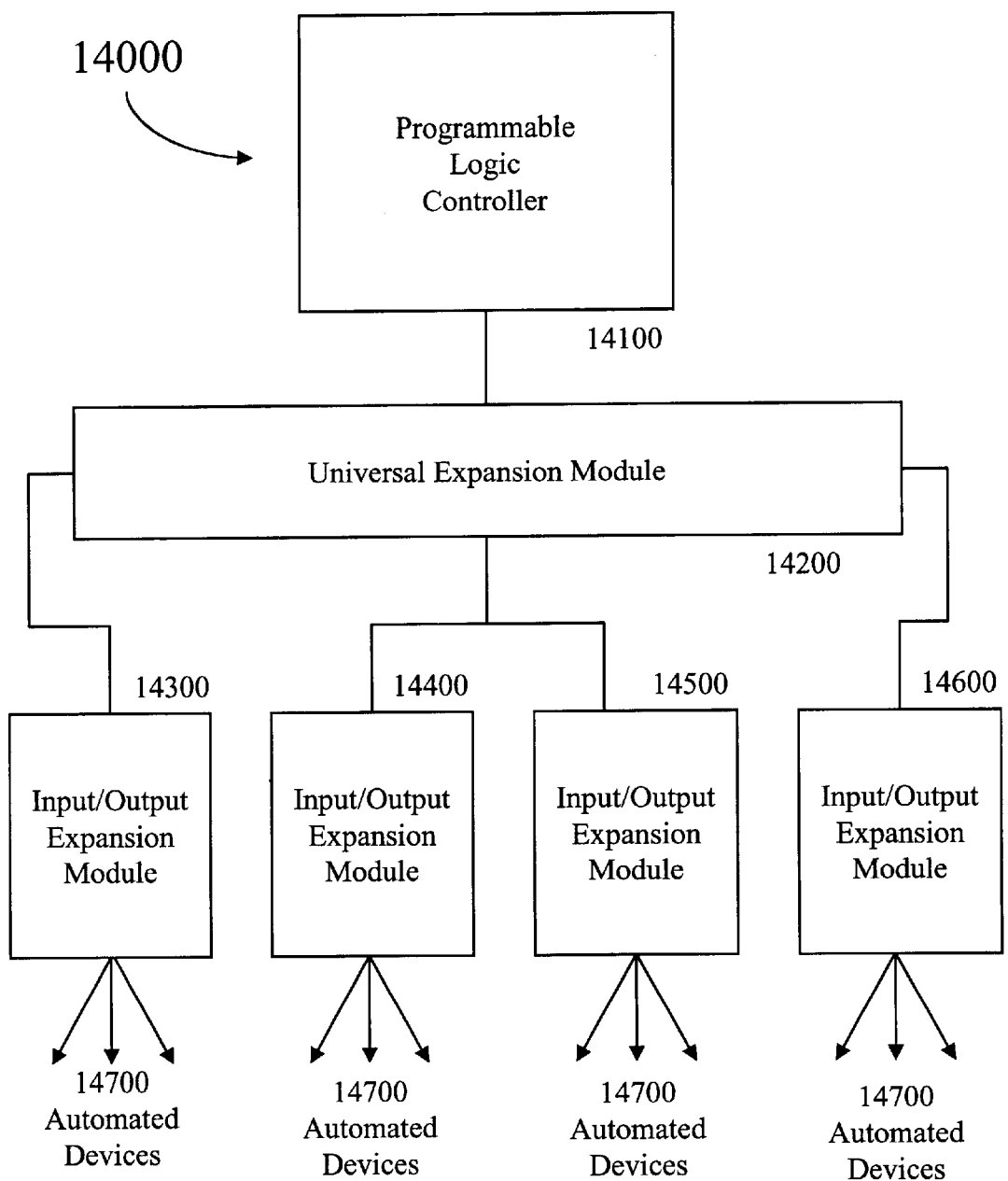
FIG. 14 is a block diagram of a programmable logic controller system 14000.

FIG. 14 is a block diagram of a programmable logic controller system 14000. An object of the present invention is to provide a universal expansion module 14200. In accordance with the foregoing objectives, the present invention provides a universal expansion module 14200 apparatus for interfacing a logic controller 14100 to a plurality of types of input/output expansion modules 14300, 14400, 14500, 14600 that communicate input/output data between the controller 14100 and automated devices 14700. A communication interface establishes communication between the controller 14000 and at least one of the plurality of types of an input/output expansion module 14300, 14400, 14500, 14600. An expansion module 14200 having a physical configuration that accommodates signals from the plurality of types of input/output expansion modules. The invention also provides a universal expansion module system. A logic controller 14000 has a configuration for driving an automated device. An input/output expansion module 14300, 14400, 14500, 14600 of a plurality of types couple the logic controller 14100 to the automated device. An expansion module 14200 has a physical configuration that accommodates signals from the plurality of types of input/output expansion 14300, 14400, 14500, 14600. The invention further provides a method for accommodating a logic controller 14100 to interface to a plurality of types of input/output expansion modules 14300, 14400, 14500, 14600. In the novel method, there is the step of providing a common physical configuration for accommodating the plurality of types of input/output expansion modules 14300, 14400, 14500, 14600. Next, there is provided establishing a first mode of operation to accommodate signals associated with a first type of input/output expansion module 14300. Then, the step of establishing a second mode of operation is provided to accommodate signals associated with a second type of input/output expansion module 14400. In order to expand the capacity of the I/O modules, it has been proposed by the inventor to provide for an I/O expansion slots to host additional I/O Expansion Modules. In order for the described PLC configuration to handle the I/O Expansion Modules, however, it is necessary to somehow adapt the configuration to account for the additional load. The present inventor has proposed to employ an Expansion Module that implements an electrical interface for each of the expansion I/O modules. This allow additional power, +5V, for example, to be introduced anywhere in the I/O bus configuration. In addition, each Expansion Module provides protection to the I/O ASIC circuitry.

Problematically, there have been traditionally a plurality of types of I/O modules available for use with the PLC configuration. The difficulty is that each type of I/O module has a different set of operating signals. Since it is not possible in advance to determine what I/O module will be introduced to a particular Expansion Module, therefore, the present invention provides a plurality of modes of operation to accommodate the different I/O modules. In other words, the present invention provides a Universal Controller Expansion Module.

It is also a problem that providing a plurality of modes of operation is cumbersome for each Expansion Module. In more particularity, it is difficult to arrange a plurality of modes of operation to handle various sets of signals and operating parameters by each Expansion Module. In addition, providing a plurality of modes of operation on each Expansion Module requires a multiplicity of circuit arrangements, which consumes both space and additional power.

In order to combat the foregoing problems, the present invention provides a novel scheme for arranging the timing of the signals for each of the plurality of modes of operation. As will be described in more detail, the timing signals are arranged so that one set of timing signals may be used to accommodate any of the plurality of modes of operation. In this manner, a common, or universal template may be used for the plurality of modes of operation. Thus, the cumbersome task of providing for various modes of operation in each device, as well as the duplicitous circuitry and extraneous power requirements, are avoided.

Before discussing the operation modes of the Expansion Modules in more detail, a description of the Expansion Module is in order. In the preferred embodiment, the Expansion Module provides the communication between the Expansion Module and the controller. As illustrated herein, the communication provided is by serial interface. Although, of course, other communication protocols may be employed with the present invention. In addition, the invention contemplates encapsulating an individual Expansion Module into an ASIC and further providing a Slave ASIC to within the Expansion Module ASIC to provide the communication interface. Although the invention will be described in terms of this ASIC configuration, one skilled in the art will appreciate that this is the preferred embodiment and that the invention may be arranged differently than in an ASIC configuration according to well known methods.

In any event, and with the understanding that the following description is not limited to the specific ASIC configuration or pin assignments, the invention shall now be described in such terms. The slave ASIC provides serial communication to all Expansion Modules (EM). The CPU provides a Master Function device function and controls all communications to and from the EM's . The Expansion Module includes an ASIC that provides a "Slave Function" or "Slave ASIC" to achieve a serial communication protocol. The Slave ASIC implements a state machine architecture to provide proper communication and control. The I/O Expansion bus signals as viewed by the Expansion Module are described in the following table in FIG. 1. At initial power up the CPU issues an active XOD signal. The connection from the PLC to the Expansion Module and from Expansion Module to Expansion Module is 1 to 1 using a 10 pin header type connection.

Figure 2A:
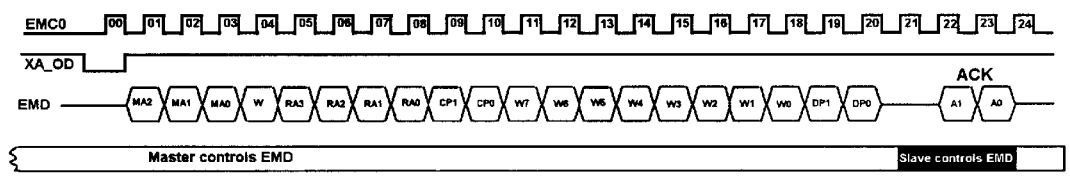
FIG. 2a is a timing diagram of an Expansion Module bus write transaction.
Figure 2B:
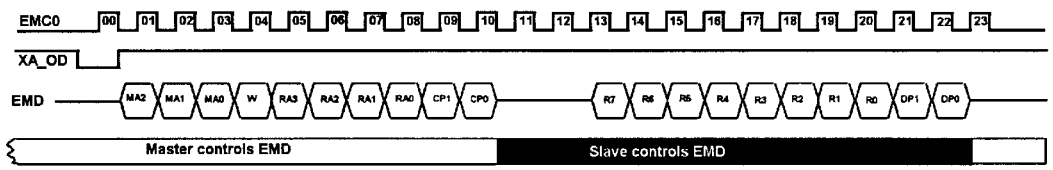
FIG. 2b is a timing diagram of an Expansion Module bus read transaction.

It was described that the invention employs a scheme for avoiding the duplicity of operations due to the different operating modes. One manner in which this is done in the present invention is by configuring the read and write cycles to have similar timings and structure. For example, the diagrams in FIGS. 2a and 2b illustrate an Expansion Module Bus Read cycle and Write cycle sequences. As will be seen, the timing of the read cycle is substantially the same, 23 or 24 cycles in the example shown. In addition, each bus transaction, read or write cycle, is initiated by short active low pulse on XA_OD signal. Further, each of the Expansion Modules Data for the read and write cycles both are initiated by a Module Address that CPU is addressing MA of an equal amount of bits in length, here 3 bits are shown for both read or write transactions MA[2:0]. Then a single bit W is transmitted indicating the Transaction Type requested by the CPU, i.e., Read/Write Bit (1=>Write, 0=>Read). Then, a Register Address that CPU is addressing of the same number of bits is transmitted, RA[3:0], for each of the read and write cycles. Next, Control Register Parity Bits generated by the CPU of the same number are transmitted for both cycles, read or write, namely CP[1:0]. An eight bit word of the same length is transmitted for either a read or write transaction, W[7:0] or R[7:0]. Finally, Data parity DP[1:0} bits are generated by the CPU for the write transaction and by the Expansion Module for the read transaction.

As will be appreciated, the read and write transactions are nearly identical in structure and timing. Indeed, the only difference in the aforementioned transactions is the acknowledge signal after the write transaction is complete, namely Ack[1:0]. These Acknowledge bits are returned to the CPU by the Slave ASIC. For bit A1, 0 indicates a successful write cycle (no parity errors) and a 1 indicates an invalid write transaction, data parity error encountered. Bit A0 defaults to a 1. In any event, the acknowledge signals are within the timing of 23 or 24 cycles and do not pose a significant deviation from the predefined timing structure. In any event, the foregoing timing will be described in more detail with reference to FIGS. 5–13.

Figure 3:
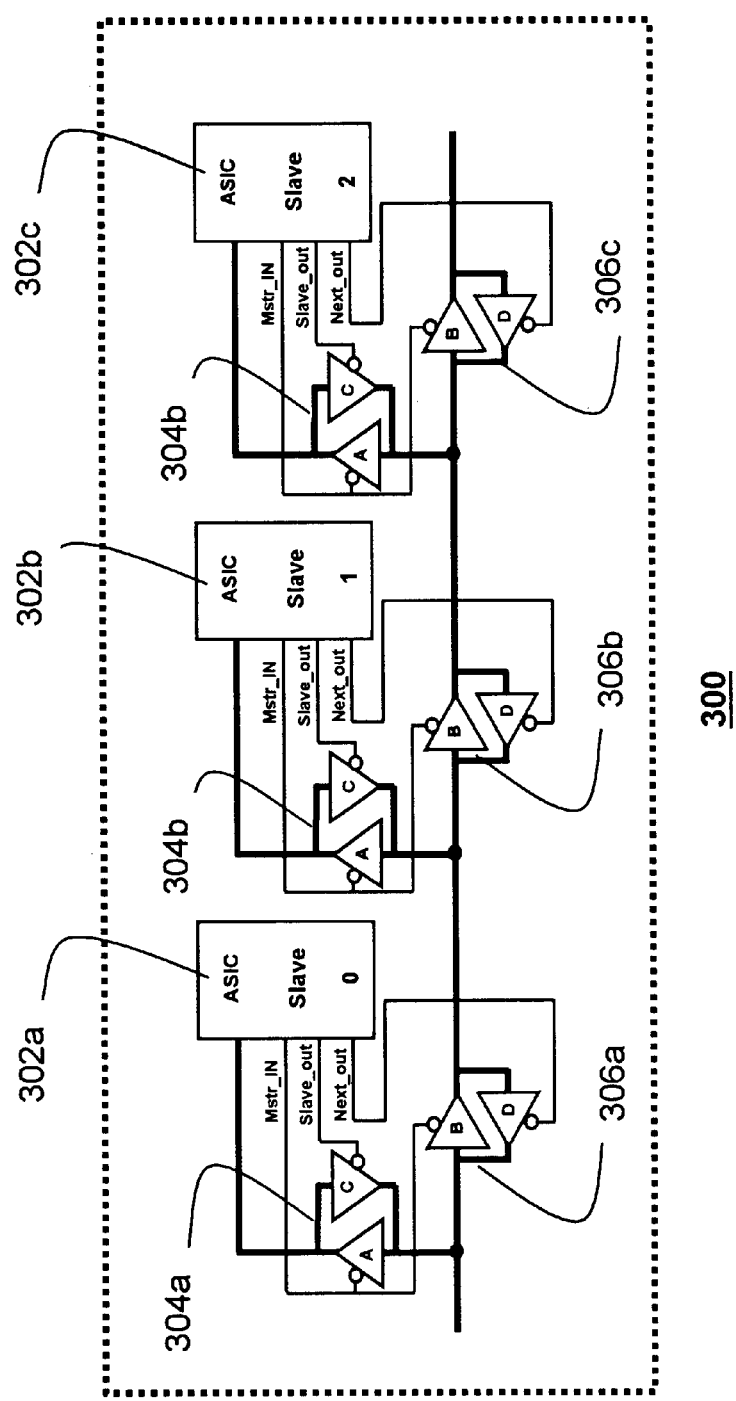
FIG. 3 is a schematic diagram of the Expansion Module bus driver circuit.

The present invention avoids duplicating circuitry by providing both the same pins for a plurality of Expansion Modules, i.e., a plurality of Modes. This is shown in FIG. 3 which shows that the same I/O Bus Electrical Interface circuitry is employed for all modes. In more detail, the Expansion Module 300 may be comprised of one or more Expansion Module Slave ASICs 302a–302c. Each slave 302a–302c shall implement an electrical interface to another expansion I/O bus consisting of termination circuits 304a–304c and bus driver circuits 306a–306c. This configuration allows the addition of power, for example, 5V, to be introduced anywhere in the daisy chained I/O bus and provides some protection of each SLAVE ASIC I/O. In the present invention, the EMD signal is a bi-directional signal. Therefore, the control circuitry in the present inventin is placed on the bus driver circuits to avoid bus contention errors. Three control signals (MSTR_IN, SLAVE_OUT, and NEXT_OUT) are used to enable/disable the EMD bus driver circuits.

At this time, the EMD Bus Driver Control will be described. A known circuit, such as the off-the shelf SN74ABT125, may be used as the bus driver circuit which has an active low enable line. The Slave ASIC generates 3 control signals to properly enable/disable the bus drivers. Control signal MSTR_IN enables bus driver circuits A and B. This allows the EMD signal to be input into the Expansion Module ASIC and to be input into the next Expansion Module ASIC down stream. MSTR_IN becomes active when XAS is detected and becomes inactive prior to any response from an EM. The signals MY_SLAVE_OUT and NEXT_SLAVE_OUT control EMD responses from the EM's according to the EM's physical address position. For example, MY_SLAVE_OUT controls the EMD signal as an output of the EM that was addressed by the CPU. The signal NEXT_SLAVE_OUT passes the EMD response through the EM if the EM addressed by the CPU has a higher address or is downstream from that EM. Neither MY_SLAVE_OUT or NEXT_SLAVE_OUT are asserted when the CPU addresses an EM with a lesser address. All three control signals immediately become inactive on the occurrence of XOD.

In more detail, the Slave ASIC schematic layout will now be described. It will be appreciated that the precise layout and pin assignments and operating parameters are but one arrangement and that other arrangements of ASICs well known to the art, of course, are within the scope of the invention. The initial Slave design is developed in a 128 Macrocell CPLD using VHDL as a design instrument. The CPLD design then migrates into an ASIC design. The ASIC has 44 total pins with 36 usable pins for I/0 and 8 pins for power and ground. The operating frequency of the SLAVE ASIC is 4.125 MHz maximum, which is well within the ASIC capability. The expansion module is preferably coupled to at least one of the input/output expansion slots. The table in FIG. 4 defines the required inputs and outputs of the Slave ASIC.

As described, the present invention accommodates all Expansion Module I/O configurations. This is accomplished by implementing a plurality of modes of operation that have similar timing diagram structures. Two modes of operation, Mode 0 and Mode 1, within the ASIC will be described with reference 5–13. Mode 0 is developed for a first type of I/O Expansion Module. Whilst, Mode 1 is for a second type of I/O Expansion Module. As will be seen, the only substantial difference in ASIC operation between the modes is the implementation of the EXT0 and EXT1 data ports.

As mentioned, the slave ASIC will be described with reference to two modes of operation. However, of course the invention encompasses a plurality of modes of operation to accommodate all Expansion Module I/O configurations. In brief, Mode 0 is used in the case where there is the type of Expansion Module having 8IN/8OUT or less data points, or pins. In terms of pin assignments, in Mode 0, the EXT0 bus is an 8 bit input register and EXT1 bus is an 8 bit, active low, output register. Thus, the EXT0 data bus and EXT1 data bus interfaces directly to the Expansion Module digital I/O.

Mode 1 is used when the Expansion Module I/O configuration is greater than 8IN/8OUT or for an intelligent module. In terms of pin assignments, therefore, in Mode 1, EXT0 bus is used as an 8 bit, active high, bi-directional data bus and EXT1 bus is used as 8 bits of address and control. Thus, external registers and decode circuitry are required for Mode 1 operation. By the way, the polarity of EXT0 data port is "active high" for both Mode 0 and 1. EXT1 data port is "active low" while in mode 0 operation and in mode 1 the control lines is "active low" and the address lines is "active high."

It shall be noted that the same ports are used for both Mode 0 and Mode 1. In the case of Mode 0, where it is considered that the type of Expansion Module has 8IN/8OUT or less data points, or pins, the EXT0 bus is used as an 8 bit input register and EXT1 bus is an 8 bit, active low, output register. In Mode 0, the EXT0 data bus and EXT1 data bus interfaces directly to the Expansion Module digital I/O. The precise same ports and pins are used for Mode 1. As will be recalled, Mode 1 is used when it is considered that the Expansion Module I/O configuration is greater than 8IN/8OUT for an intelligent module. In Mode 1, EXT0 bus is used as an 8 bit, active high, bidirectional data bus and EXT1 bus is used as 8 bits of address and control. Thus, from Mode 0 to Mode 1, the EXT0 port changes from an input register to a bidirectional bus. EXT1 is transformed from an output to an address and control register.

In order to determine the proper mode of operation, the present invention provides a special register, the ID_REG. The ID_REG register is decoded by each Expansion Module at power up to determine its mode of operation. The ID_REG also reads by the CPU to determine the Expansion Module type.

A transaction in either mode is initiated upon the detection of XOD. This detection places the state machine into its home state and the EXT1 data port is cleared if in mode 0 or the external output registers is cleared if in mode 1. Also at initial power up, the Slave ASIC determines its Module Address (MA_IN), Mode of operation (Mode 0 or 1) and propagates the next Module Address (MA_OUT) by incrementing its Module Address by 1. Once XOD is released, the Slave ASIC state machine continuously monitors the XAS signal from its home state.

A bus transaction is initiated when XAS becomes active and transitions to state 0 on the first rising edge of EMC0 clock. At state 0 the state machine is placed into a known state and propagates to state 1 on the next rising edge of EMC0 clock. If at any time the XOD signal becomes active, then the EXT1 data port is asynchronously reset and the state machine returns to its home state. If in mode 1 operation, the external output registers is asynchronously cleared and the state machine returns to its home state. The next occurrence of XAS synchronously places the state machine into a known state, namely one of the Modes 0 or 1 and a read or write transaction is initiated. The Modes 0 and 1 will now be described for each of a read and write transaction.

Figure 5:
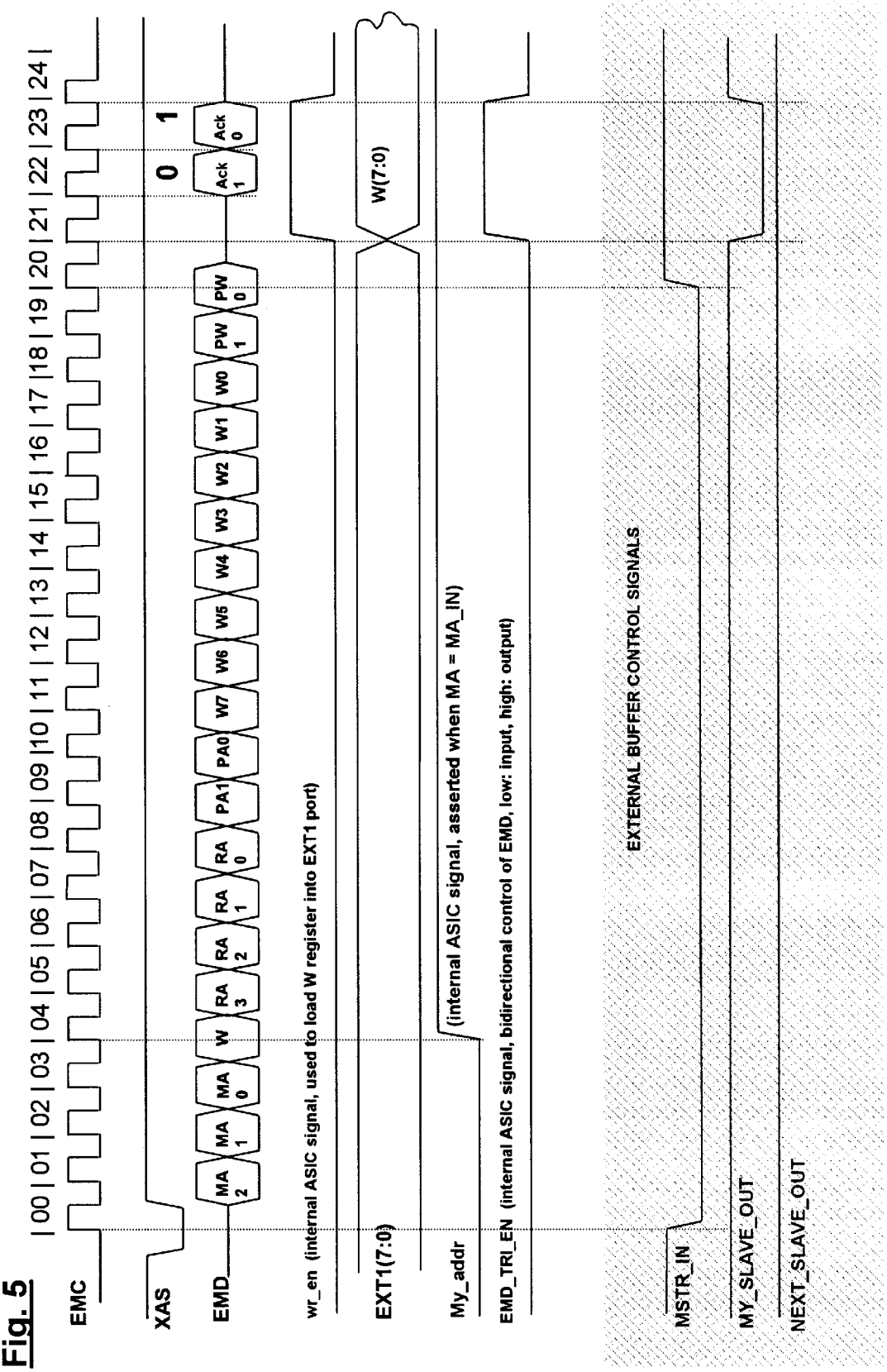
FIG. 5 is a timing diagram of a Mode 0 write transaction.

The Mode 0 Write Transaction will now be described with reference to FIG. 5. Once a valid XAS is detected as previously described, the Slave ASIC propagates to state 0 of the control state machine on the first rising edge of EMC0 clock. At state 0, the MSTR_IN signal is asserted and the EMD signal is enabled as an input to the Slave ASIC. The control state machine begins to shift in the control register data beginning on the rising edge of EMC0 clock 1 (state 1) and ending on the rising edge of EMC0 clock 10 (state 10). At state 4 (EMC0 clock 4) the Slave ASIC determines if the Module Address (MA) shifted in from the CPU equals the Module Address (MA_IN) propagated in at power up and if true "My_addr" is asserted. In the case that the addresses do not match, My_addr is not asserted, and the state machine continues through the remaining states to account for proper EMD bus driver control and control register parity checks. At State 10 the Slave ASIC determines the type of transaction to occur and enters either the write state machine or read state machine on the next EMC0 clock.

During a write transaction the Slave ASIC shifts in Write data beginning at state 11 (EMC0 clock 11) and ending at state 20 (EMC0 20). Also, during state 11 the control register parity is checked and in the event an error is detected on the control register the write state machine returns to an idle state and the control state machine returns to its home state on the next EMC0 clock. EXT1 data port is not be disturbed and the MSTR_IN bus control signal becomes inactive. If no control register parity error is detected then the write data is shifted in accordingly. At state 20 the MSTR_IN bus control signal is released and at state 21 the state machine prepares the EMD bus control signals for a response back to the CPU. If "My_addr" is valid then MY_SLAVE_OUT bus control signal is asserted. If "My_addr" is not valid then the NEXT_SLAVE_OUT bus control signal is asserted only if the CPU has addressed a module of a greater address.

At state 22 the Slave ASIC checks parity on the write data. When a write data parity error is detect the Slave ASIC returns an invalid (11) Acknowledge to the CPU and does not present new data to EXT1 data port. If no parity error is detected, then the Slave ASIC returns a valid (01) Acknowledge to the CPU, decodes the register address (RA) and enables new data onto the EXT1 data port if register address 'C' (hex) has been decoded. If any other register is decoded the state machine still returns a valid Acknowledge to the CPU, but does not present new data to the EXT1 data port. This is only true while in mode 0 operation. On the rising edge of EMC0 clock 24 the write state machine returns to an idle state and the control state machine returns to its home state. Thus, concluding the Mode 0, Write Bus Transaction.

Figure 6:
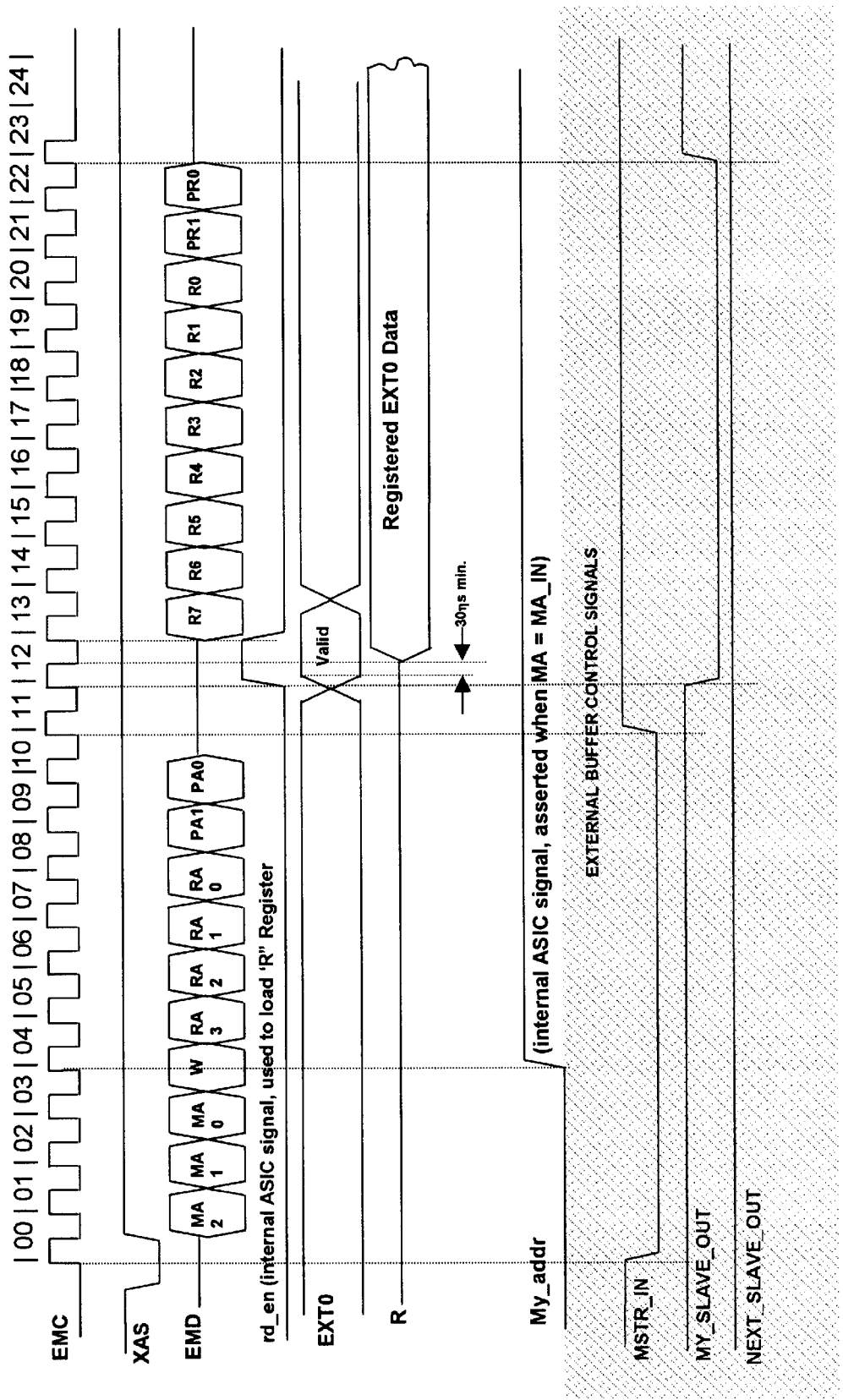
FIG. 6 is a timing diagram of a Mode 0 read transaction.

The Mode 0 Read Transaction is shown in FIG. 6. There it is illustrated a mode 0 read transaction with the CPU addressing RA 8(hex). It is important to note that the control state machine operates the same as the previous write bus transaction, except at state 10 it now enters the read state machine. At state 11 the read machine releases the EMD bus control signal MSTR_IN, select the EMD (EMD_TRI_EN) bidirectional port as an output, and checks the control register parity. If a parity error occurs the read state machine returns to an idle state and the control state machine returns to a home state on the next rising edge of EMC0 clock. If no error was detected then the read state machine propagates to state 12 on the next rising edge of EMC0 clock.

At state 12 the state machine prepares the EMD bus control signals for a response back to the CPU by asserting bus control signal MY_SLAVE_OUT. Also at state 12 the register address (RA) is decoded to determine the data source. If RA decodes to 0 then the ID_BUF data is enabled, if RA decodes to 8 then EXT0 data bus is enabled, and if any other address is decoded then the hex value FF is enabled. On the falling edge of EMC0 12 the "R" register is loaded with the appropriate data either from the EXT0 data bus, the ID_BUF, or the default value of FF. For the case in FIG. 2 the EXT0 data is loaded into the "R" register. On the next rising edge of EMC0 clock (state 13) the read state machine shifts the read data bit 7 onto the EMD line and the last read bit 0 is shifted in on the rising edge of EMC0 clock 20 (state 20). The Slave ASIC generates 2 parity bits, PR1 and PR0, on the 8 bits of read data and shifts this data onto the EMD line at states 21 and 22. At state 23 all EMD bus control signals are released, the read machine returns to an idle state and the control machine returns to its home state. Thus, concluding the Mode 0 Read Bus Transaction.

The Mode 1 Operation will now be described. It shall be recalled that, in Mode 1, the same pins are employed as for Expansion Modules used for Mode 0. In Mode 1, however, the EXT1 bus is used as a control port. The various bit assignments to control Mode 1 through the EXT1 bus will be described with reference to the table in FIG. 7a.

The Mode 1 Write Bus Transaction will now be described. It is important to note that the control register state machine and the write state machine function the same for Mode 1 as previously described for Mode 0. In the case of Mode 1, however, the external port usage and the available registers differs from Mode 0. In mode 1, EXT1 data port is used as a control port for external decode circuitry and EXT0 data port is a bidirectional data port. It shall be appreciated that the precise same pins are utilized for the Mode 0 and Mode 1 modes. In other words, additional or modified circuitry is not needed for the two different types of I/O Expansion Modules. The invention allows for connection to both types using the same pins. Only the modes need to be changed and there is provided universal connection to a plurality of Expansion Modules.

Figure 7B:
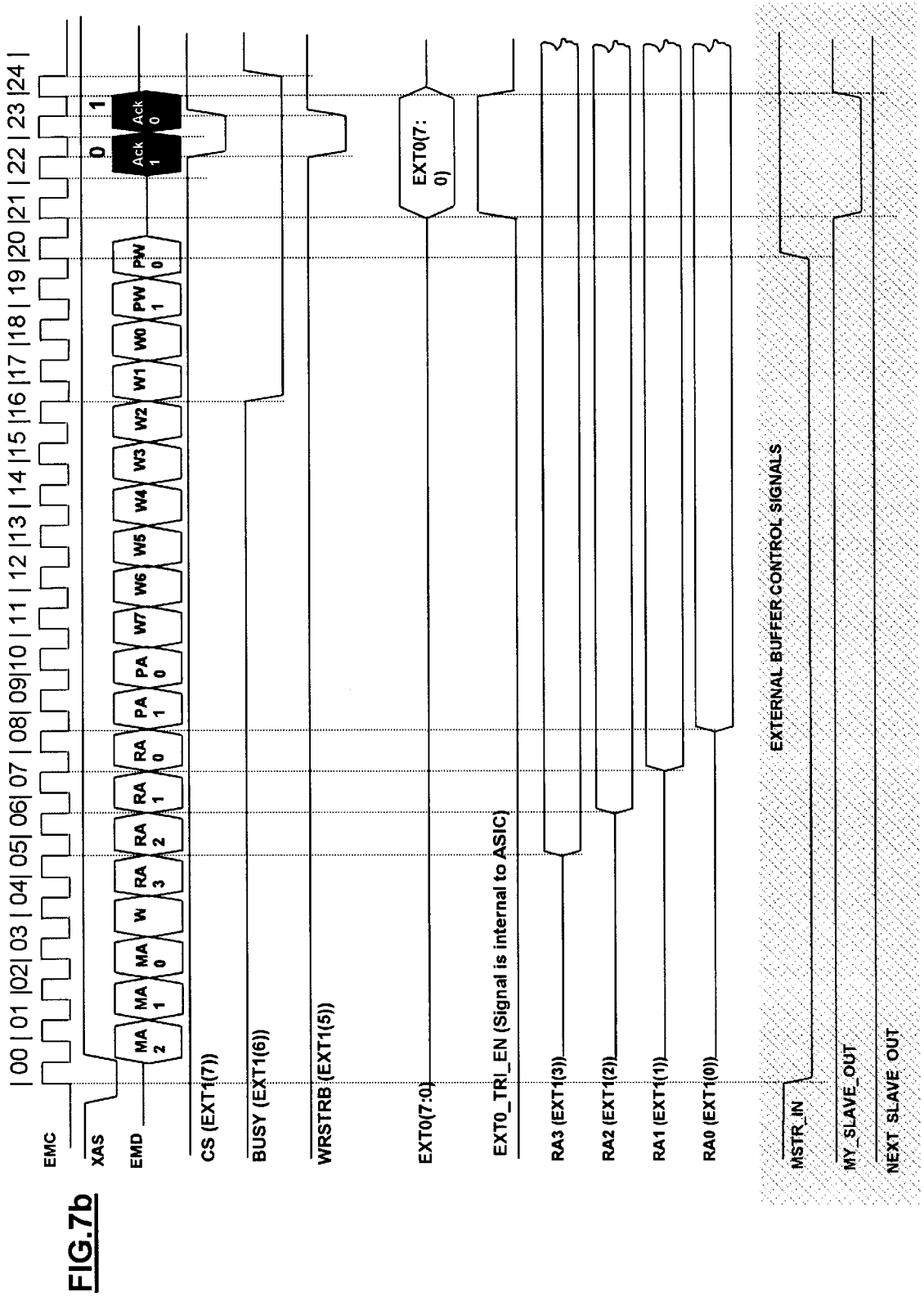
FIG. 7b is a timing diagram of a Mode 1 write transaction.
Figure 8:
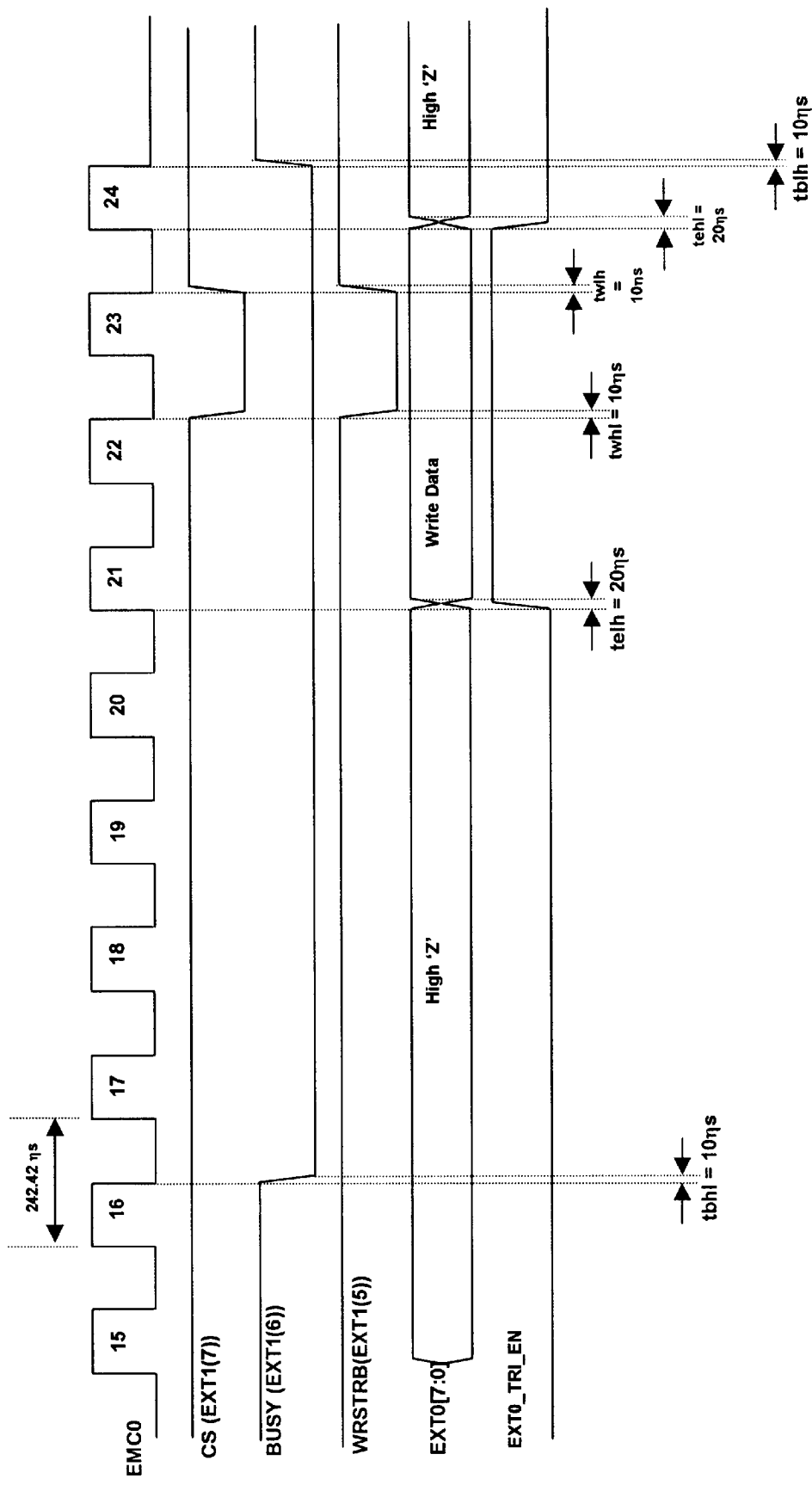
FIG. 8 is a timing diagram of a Mode 1 write transaction.

As shown in FIGS. 7b and 8, write data is enabled onto EXT0 data port on the rising edge of EMC0 clock 21 and is valid for 3 clock periods. The Register Address (RA[3:0]) is clock'd onto EXT1 data port on the falling edge of EMC0 clocks 5, 6, 7, & 8 respectively. All 16 register addresses is available for external decode. The WRSTRB is asserted on the falling edge of ECMO clock 22 and is cleared on the falling edge of EMC0 clock 23. The signal Busy is asserted on the falling edge of EMC0 clock 16 and is cleared on the falling edge of EMC0 clock 24. If a parity error is detected on the WRITE byte, then both the ASIC registers and the external registers retains their last received value. Refer to the FIGS. 7b and 8 for detailed timing information.

Figure 9:
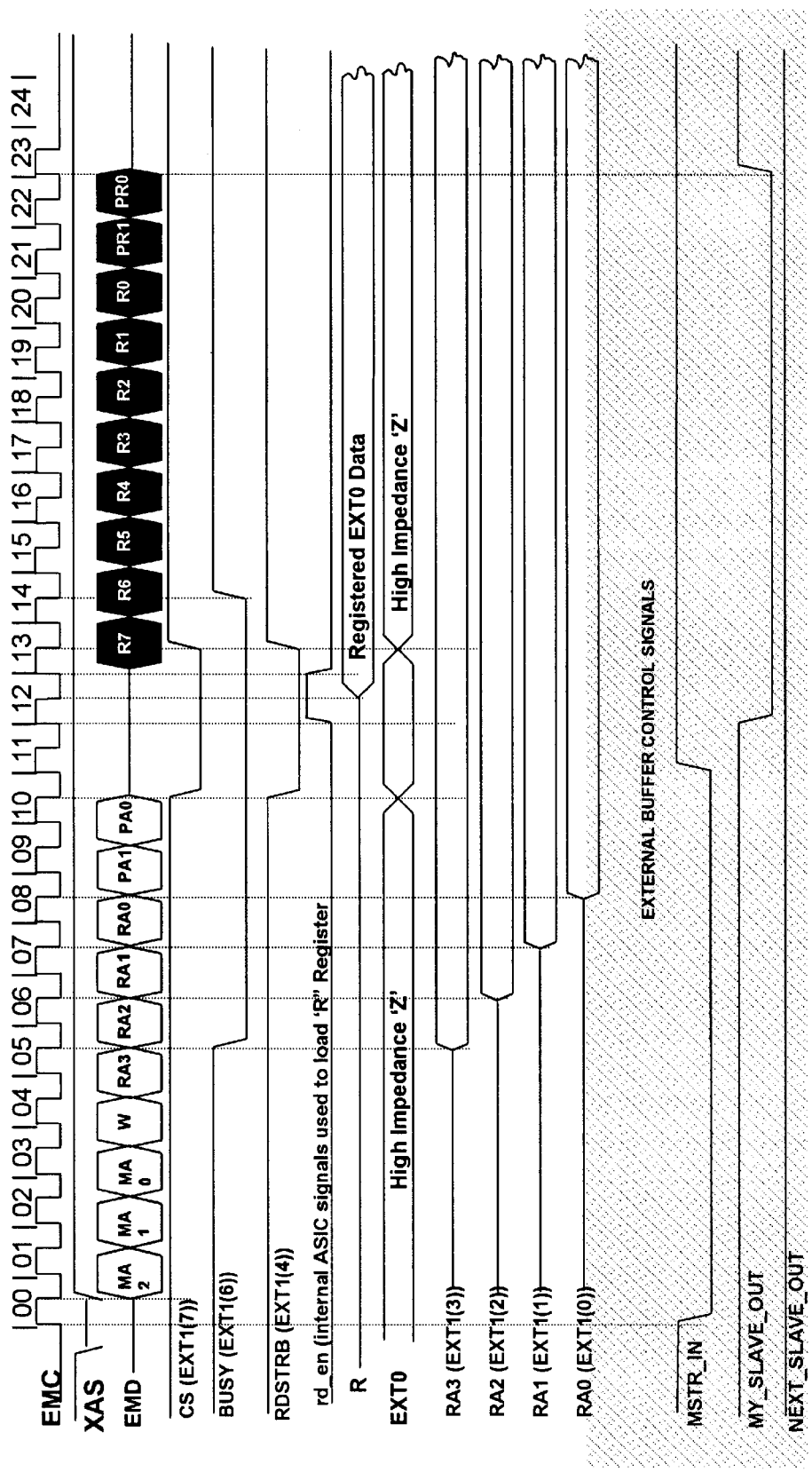
FIG. 9 is a timing diagram of a Mode 1 read transaction.
Figure 10:
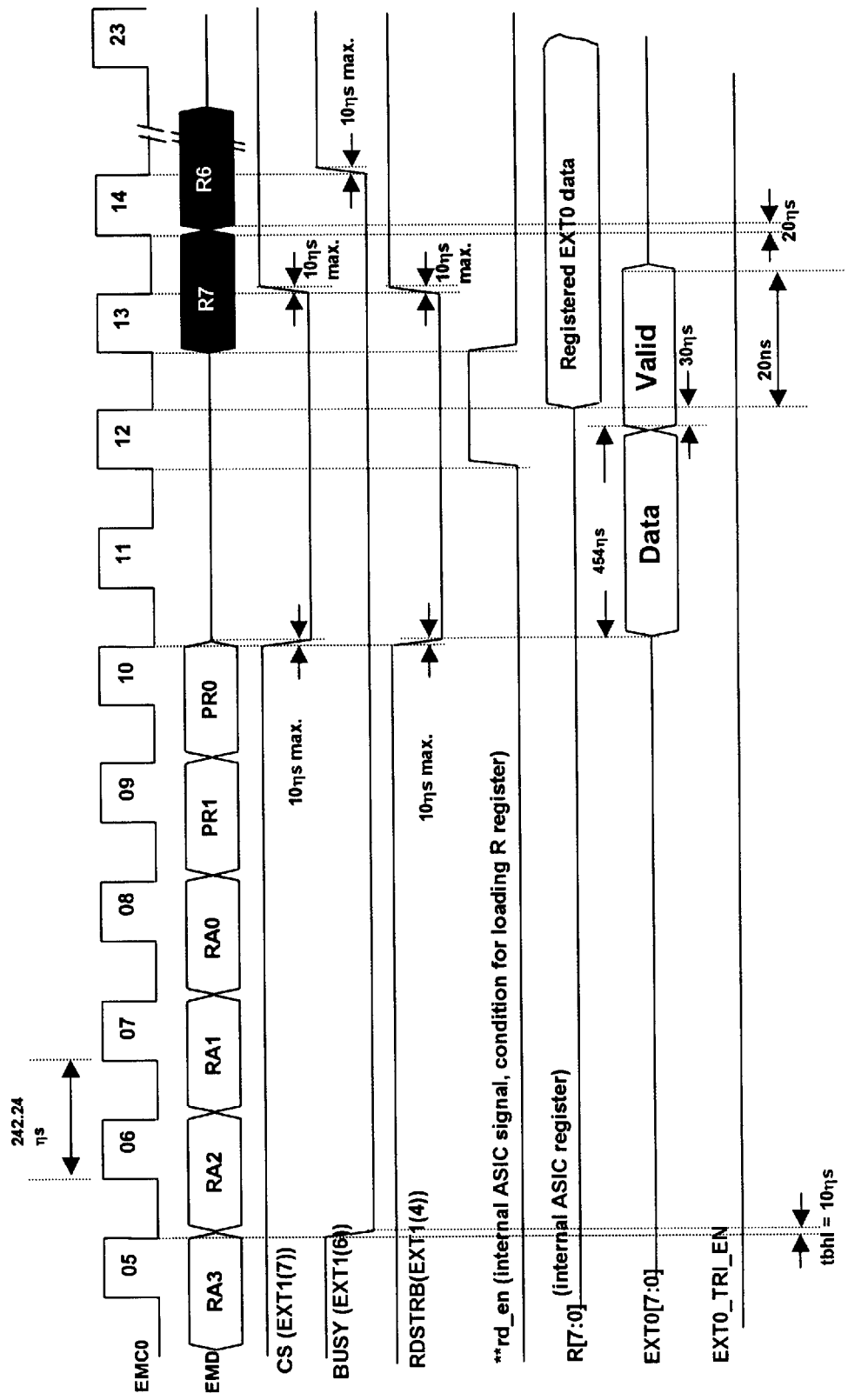
FIG. 10 is a timing diagram of a Mode 1 read transaction.

The Mode 1 Read Bus Transaction will now be described with reference to FIGS. 9 and 10. The control register state machine and the read state machine function the same as in mode 0, however external port usage and the available registers differ from mode 0. In mode 1, EXT1 data port is used as a control port for external decode circuitry and EXT0 data port is a bi-directional data port. Also, the CPU can access all 16 registers in Mode 1 with register 0 still the ID register.

In a preferred embodiment, the ID Register is addressed from Register Address (RA) 00 hex and is defined in DWG 2808000 section 8. The Slave ASIC fill bits 7 with a 0 and the remaining 7 bits is hardwired according to the Module type. According to the ID Register definition, the Slave ASIC operates in ASIC Mode 0 only for ID Register values of 01, 04, and 05 hex. All other ID Register values operates in Mode 1. Of course, the specific parameters set forth here are merely exemplary and, as one skilled in the well knows, can be modified within the scope of the invention.

Figure 11:
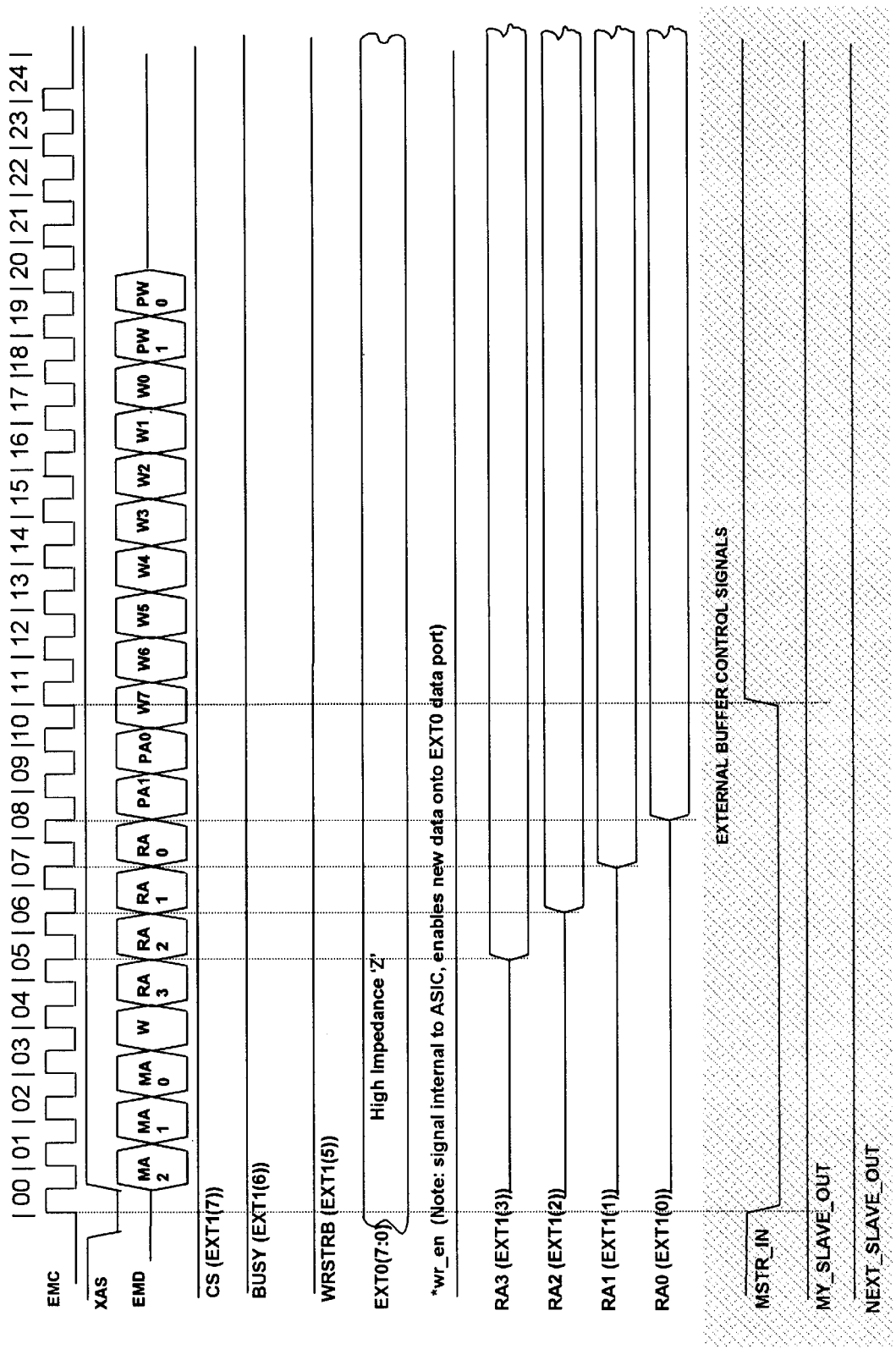
FIG. 11 is a timing diagram of a Mode 1, Control Register Parity Error during Write Transaction.
Figure 12:
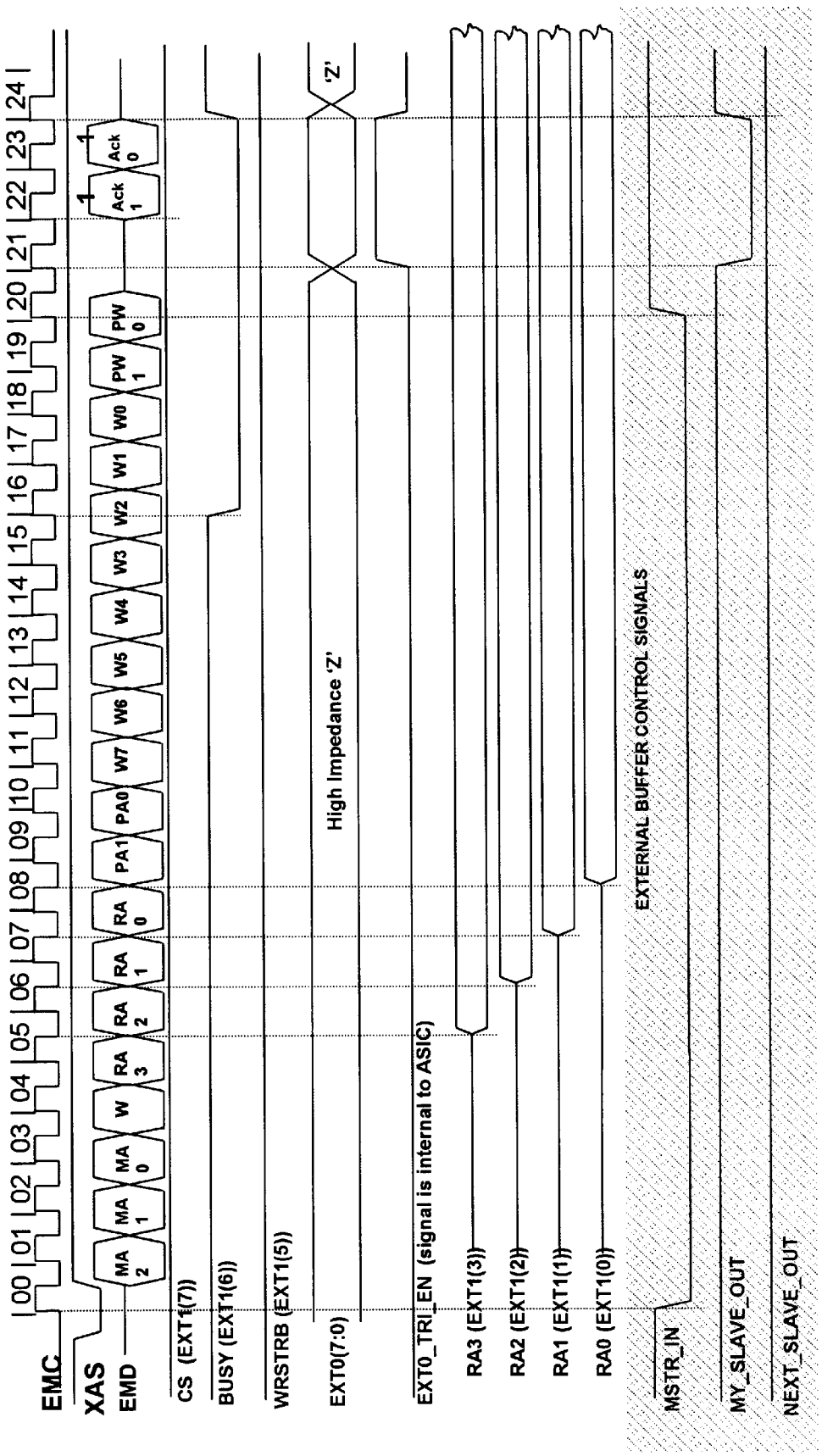
FIG. 12 is a timing diagram Mode 1, Write Register Parity Error during a Write Transaction.
Figure 13:
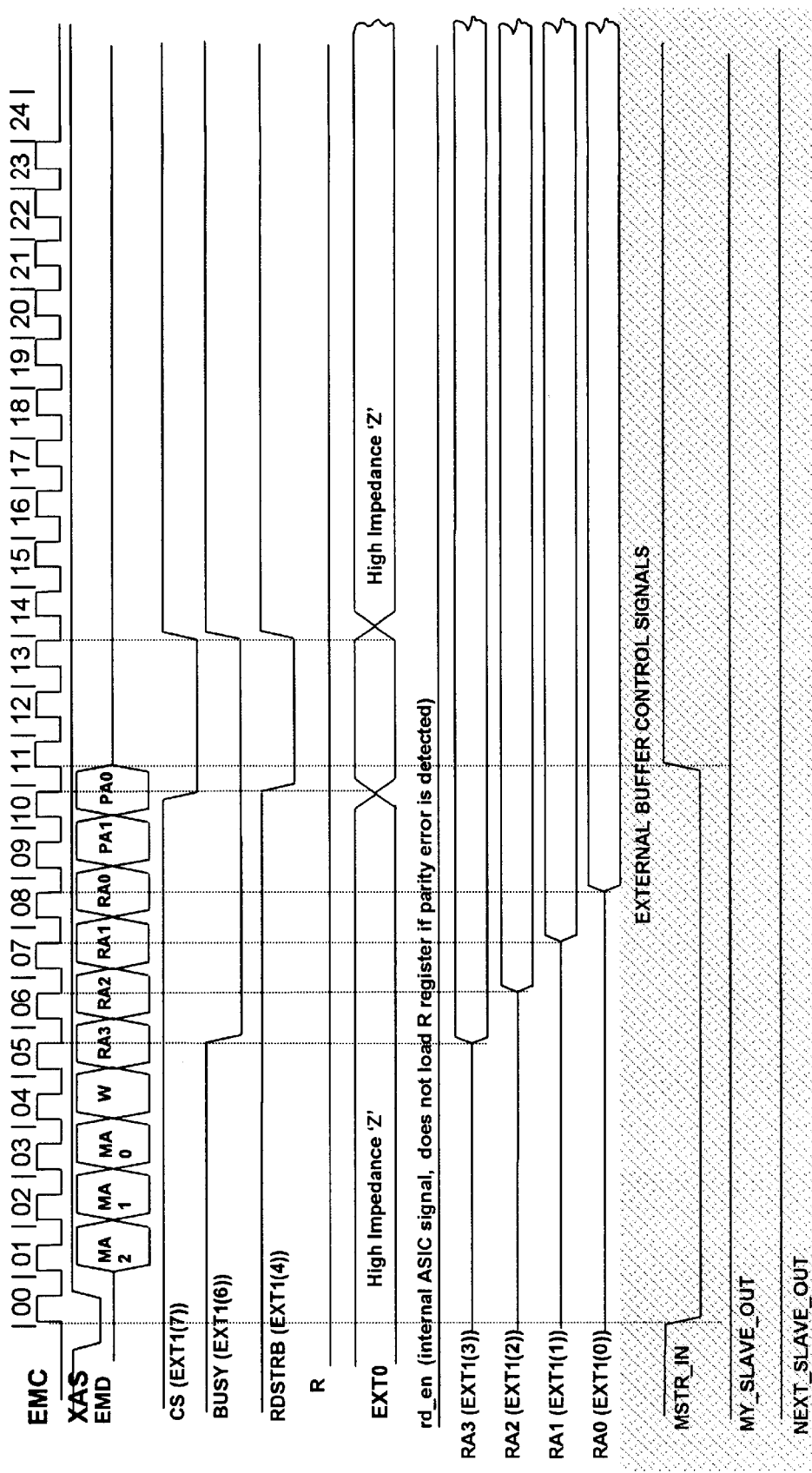
FIG. 13 is a timing diagram Mode 1, Write Register Parity Error during a Write Transaction.

The present invention further offers a universal method for parity checking for all Modes and types of bus transaction, i.e., Read or Write. FIGS. 11–13 illustrate Mode 1 Read and Write Bus transactions that display various parity errors. In particular, the figures illustrate the Bus operation/response under these conditions. Mode 0 bus transactions responds to these errors in the same manner. Again, the invention provides for universal response to a plurality of Expansion Modules. In more detail, FIG. 11 illustrates the Mode 1, Control Register Parity Error during a Write Transaction. In this instance, the bus EXT1 responds to a parity error in bits RA3:RA0 and, as a result, causes bits EXT1(3):EXT1(0) to become active. As a result, the MSTR_IN control signal switches off and the transaction is aborted. FIG. 12 illustrates the Mode 1, Write Register Parity Error during a Write Transaction. Similarly, the bits RA3:RAO indicate a parity error and, in response thereto, the MSTR_IN control line switches off and the transaction is aborted. FIG. 13 illustrates the Mode 1, Control Register Parity Error During a Read Transaction. The same situation applies to this instance, where the RA3:RA0 bits indicate a parity error and the MSTR_IN control signal switches off.

Therefore, the present invention provides uniformity of parity checking using the same bits as in each of the Modes and for all of the types of transactions, whether Read or Write.

I claim:

1. A universal expansion module apparatus for interfacing a programmable logic controller to a plurality of types of input/output expansion modules that communicate input/output data between the programmable controller and automated devices, said universal expansion module apparatus comprising:

a communication interface, adptable to establish communication between the programmable logic controller and at least one of the plurality of types of input/output expansion modules; and an expansion interface comprising a physical configuration that accommodates signals from the plurality of types of input/output expansion modules.

2. The apparatus according to claim 1, wherein said expansion interface comprises at least a first port for receiving the signals from the plurality of types of input/output expansion modules.

3. The apparatus according to claim 2, wherein said first port comprises a predetermined physical pin layout for receiving the signals from the plurality of types of input/output expansion modules.

4. The apparatus according to claim 2, wherein said first port is adaptable to be set to a first mode corresponding to a first type of input/output expansion module, wherein said first mode is adaptable to establish said first port to be an input register capable of receiving input signals.

5. The apparatus according to claim 4, wherein said first port is adaptable to be reset to a second mode corresponding to a second type of input/output expansion module, wherein said second mode is adaptable to establish said first port to be a bi-directional register capable of inputting and outputting signals.

6. The apparatus according to claim 2, wherein said expansion interface further comprises a second port adaptable to be set to a first mode corresponding to a first type of input/output expansion module, wherein said first mode is adaptable to establish said second port to be an output register adaptable to transmit output signals.

7. The apparatus according to claim 6, wherein said second port is adaptable to be reset to a second mode corresponding to a second type of input/output expansion module, wherein said second mode is adaptable to establish said second port to be a address and control register adaptable to receive an address adaptable to access a control instruction in said universal expansion module.

8. The apparatus according to claim 1, wherein said expansion interface comprises a first mode of operation adaptable to accommodate a first type of input/output expansion module, and a second mode of operation to adaptable to accommodate a second type of input/output expansion module.

9. The apparatus according to claim 8, wherein said expansion interface is adaptable to transmit and receive read and write transactions, wherein a read transaction has substantially the same structure as the write transaction.

10. The apparatus according to claim 1, wherein said expansion interface is formed as an integrated package with said universal expansion module.

11. The apparatus according to claim 10, wherein said universal expansion module comprises a plurality of integrated expansion interfaces integrated in said integrated package, each couplable to a different type of said input/output expansion module of said plurality of types of input/output expansion modules.

12. The apparatus according to claim 11, wherein at least one of said plurality of integrated expansion interfaces is an ASIC.

13. A system, comprising:

a programmable logic controller having a configuration for driving automated devices;

a plurality of types of input/output expansion modules adaptable to couple said programmable logic controller to said automated devices; and a universal expansion module having a physical configuration adaptable to accommodate signals from said plurality of types of input/output expansion modules.

14. The system according to claim 13, wherein said programmable logic controller is adaptable to control the operation of said universal expansion module adaptable to accommodate said plurality of types of input/output expansion modules.

15. The system according to claim 13, wherein said universal expansion module is adaptable to establish an interface of communication between the programmable logic controller and at least one of the plurality of types of input/output expansion modules.

16. The system according to claim 13, wherein said universal expansion module is formed as an integrated package.

17. The system according to claim 16, wherein said integrated package is an ASIC.

18. The system according to claim 13, wherein said programmable logic controller comprises a physical configuration that is adaptable to provide a plurality of input/output expansion slots.

19. The system according to claim 18, wherein said programmable logic controller comprises a physical configuration that provides a common bus and power source and a plurality of input/output slots.

20. The system according to claim 18, wherein at least one input/output expansion slot is couplable to said universal expansion module.

* * * * *